United States Patent [19]

Ishiura et al.

[11] Patent Number: 5,859,131
[45] Date of Patent: Jan. 12, 1999

[54] RESIN COMPOSITION AND MOLDED ARTICLE OF THE SAME

[75] Inventors: Kazushige Ishiura; Katsunori Takamoto; Takashi Yamashita, all of Tsukuba; Syuichi Kanao; Syunji Kaneda, both of Kurashiki; Hiromichi Nakata, Kamisu-machi, all of Japan

[73] Assignee: Kuraray Co. Ltd., Kurashiki, Japan

[21] Appl. No.: 828,284

[22] Filed: Mar. 21, 1997

[30] Foreign Application Priority Data

Mar. 21, 1996 [JP] Japan ................................ 8-091891

[51] Int. Cl.$^6$ ...................................... C08L 59/00
[52] U.S. Cl. .................... 525/92 C; 525/92 K; 525/131; 525/154
[58] Field of Search ................ 525/92 C, 92 K, 525/131, 154

[56] References Cited

U.S. PATENT DOCUMENTS

| | | |
|---|---|---|
| 4,277,577 | 7/1981 | Burg et al. . |
| 5,115,035 | 5/1992 | Shiraki et al. . |
| 5,206,301 | 4/1993 | Hattori ..................................... 525/314 |
| 5,332,784 | 7/1994 | Shiraki et al. . |
| 5,393,837 | 2/1995 | Kinoshita et al. . |
| 5,436,295 | 7/1995 | Nishikawa ............................ 525/92 C |
| 5,439,976 | 8/1995 | Kinoshita et al. . |

FOREIGN PATENT DOCUMENTS

| | | |
|---|---|---|
| 0 522 658 | 1/1993 | European Pat. Off. . |
| 0 561 594 | 9/1993 | European Pat. Off. . |

*Primary Examiner*—Patricia A. Short
*Attorney, Agent, or Firm*—Oblon, Spivak, McClelland, Maier & Neustadt, P.C.

[57] ABSTRACT

A resin composition containing (A) a thermoplastic polyurethane; (B) a polymer having a hydroxyl group at the end of the molecular main chain, the main chain principally comprising a conjugated diene compound unit (I) which may or may not be hydrogenated and an aromatic vinyl compound unit (II); and (C) a polyacetal resin, at ratios of (A), (B) and (C) being 2.5 to 90% by weight, 2.5 to 90% by weight and 5 to 95% by weight, respectively, on the basis of the total weight of the (A), (B) and (C), is excellent in terms of tensile strength and tensile elongation, and impact resistance at ambient temperature and lower temperatures.

6 Claims, No Drawings

RESIN COMPOSITION AND MOLDED ARTICLE OF THE SAME

BACKGROUND OF THE INVENTION

1. Field of the Invention

The present invention relates to a resin composition containing a polyacetal resin, a thermoplastic polyurethane and a specific polymer having a hydroxyl group at the end; and a molded article comprising the resin composition. The resin composition of the present invention is excellent in terms of mechanical performance such as tensile strength and tensile elongation, and impact resistance at ambient temperature and lower temperatures; wear resistance; and moldability. Therefore, the resin composition is useful as a material of a variety of molded articles.

2. Related Art of the Invention

Polyacetal resins have been used in wider fields as an engineering resin with good tensile strength and elongation, electrical properties, chemical resistance and thermal resistance. However, polyacetal resins have poor impact resistance, and therefore, as a method for improving the impact resistance, a technique of blending a rubber component has been known. In order that the rubber component might be finely dispersed in the matrix of the polyacetal resins to make the impact resistance effectively exerted, thermoplastic polyurethanes with a higher polarity have been used because polyacetal resins are highly polar. However, even a resin composition comprising a thermoplastic polyurethane blended in a polyacetal resin still remains to be improved, regarding the impact resistance at lower temperatures and the like.

So as to improve the polyacetal resins from the respect of the impact resistance at lower temperatures, the weatherability and the like, attempts have been made to add a styrene block copolymer to the resins. However, generally, such styrene block copolymer may not be dispersed finely; and when the resulting resin composition is modified into molded articles, delamination occurs severely while the tensile elongation is decreased markedly.

It has been known that a molding composition of a mixture of a polyacetal resin, an elastomer with a softening point below the crystallite melting point of the polyacetal resin and with a second-order transition temperature of −120° C. to +30° C., and a thermoplastic polyurethane, has good impact resistance (U.S. Pat. No. 4,277,577). However, the polyacetal resin-derived performance such as tensile strength and tensile elongation is severely deteriorated in the molding composition; and furthermore, the impact resistance may sometimes be insufficient for some use.

SUMMARY OF THE INVENTION

It is a first object of the present invention to provide a resin composition containing a polyacetal resin and a thermoplastic polyurethane, wherein the resin composition has good tensile strength and tensile elongation and superior impact resistance at ambient temperature, and additionally, the resin has improved impact resistance at lower temperatures.

It is a second object of the present invention to provide a molded article in which the aforementioned characteristics are effectively utilized.

So as to attain the objects, the present inventors have made investigations to find that by blending a specific polymer into a composition of a polyacetal resin and a thermoplastic polyurethane, further, not only the tensile strength and tensile elongation and the impact resistance at ambient temperature but also the impact resistance at lower temperatures can be improved greatly. After additional investigations, the inventors have achieved the present invention.

More specifically, firstly, the present invention is a resin composition (1) containing a thermoplastic polyurethane (A); a polymer (B) having a hydroxyl group at the end of the molecular main chain, the main chain principally comprising a conjugated diene compound unit (I) which may or may not be hydrogenated and an aromatic vinyl compound unit (II), wherein the molar ratio of the unit (I) / the unit (II) is within a range of 10/90 to 90/10; and a polyacetal resin (C), provided that at least part of the thermoplastic polyurethane (A) and at least part of the polymer (B) may or may not be present in the form of a block copolymer formed from the chemical reaction of the thermoplastic polyurethane (A) with the polymer (B) at the end hydroxyl position thereof, (2) the ratio of (A) being 2.5 to 90% by weight; the ratio of (B) being 2.5 to 90% by weight; and the ratio of (C) being 5 to 95% by weight on the basis of the total weight of the (A), (B) and (C).

Secondly, the present invention is a molded article comprising the resin composition.

DETAILED DESCRIPTION OF THE INVENTION

In accordance with the present invention, the thermoplastic polyurethane (A) may be produced by for example reacting together a polymer diol, an organic di-isocyanate and a chain-lengthening agent to prepare urethane.

As such polymer diol, preference is given to esteric polymer diols such as polyester diol, polycarbonate diol, and polyester polycarbonate diol. The number average molecular weight of the polymer diol is preferably 1,500 to 6,000, and more preferably 2,000 to 6,000. In the present specification, the number average molecular weight of the polymer diol is a number average molecular weight calculated on the basis of the hydroxyl value measured according to JIS K1577.

The polyester diol may be produced by for example subjecting a dicarboxylic acid or an ester forming derivative thereof such as ester or anhydride, together with a low-molecular diol, to esterification reaction or ester exchange reaction, according to routine methods.

As the dicarboxylic acid to be used as the starting material of polyester diol, use may be made of for example aliphatic dicarboxylic acids with 5 to 12 carbon atoms, such as glutaric acid, adipic acid, pimeric acid, suberic acid, azelaic acid, sebacic acid, dodecanedicarboxylic acid, 2-methylsuccinic acid, 2-methyladipic acid, 3-methyladipic acid, 3-methylpentanedioic acid, 2-methyloctanedioic acid, 3,8-dimethyldecanedioic acid, and 3,7-dimethyldecanedioic acid; and aromatic dicarboxylic acids such as terephthalic acid, isophthalic acid and orthophthalic acid, and these may be used singly or in combination of two or more thereof. Among them, preferably, use may be made of aliphatic dicarboxylic acids with 5 to 12 carbon atoms; and more preferably, use may be made of adipic acid, azelaic acid and sebacic acid.

As the low-molecular diols to be used as the starting material of polyester diol, use may be made of for example aliphatic diols such as ethylene glycol, 1,3-propanediol, 2-methyl-1,3-propanediol, 1,4-butanediol, neopentyl glycol, 1,5-pentanediol, 3-methyl-1,5-pentanediol, 1,6-hexanediol, 1,8-octanediol, 2-methyl-1,8-octanediol, 1,9-nonanediol, and 1,10-decanediol; and alicyclic diols such as cyclohexanedimethanol, and cyclohexanediol, and these may be used singly or in combination with two or more thereof.

The polycarbonate diol may be produced by for example reacting a low-molecular diol with a carbonate compound such as dialkyl carbonate, alkylene carbonate, and diaryl carbonate. As the low-molecular diol as the starting material for producing polycarbonate diol, use may be made of the low-molecular diol, illustrated above as the starting material for producing polyester diol. The dialkyl carbonate furthermore includes dimethyl carbonate, diethyl carbonate, etc.; the alkylene carbonate includes ethylene carbonate, etc.; and the diaryl carbonate includes diphenyl carbonate, etc..

The polyester polycarbonate diol described above may be produced by for example simultaneously reacting a low-molecular diol, dicarboxylic acid and a carbonate compound together. Otherwise, polyester polycarbonate diol may be produced by independently synthesizing polyester diol and polycarbonate diol preliminarily by the methods described above, and subsequently reacting them with a carbonate compound or reacting them with diol or dicarboxylic acid.

The type of the organic di-isocyanate to be used for producing the thermoplastic polyurethane (A) may not specifically be limited, and use may be made of any of organic di-isocyanates having been used conventionally for producing general thermoplastic polyurethanes. Preference is given to the use of one or a combination of two or more of aromatic, alicyclic or aliphatic di-isocyanates with molecular weights of 500 or less. Preferable examples of organic di-isocyanates include 4,4'-diphenylmethanediisocyanate, p-phenylene diisocyanate, xylylene diisocyanate, hexamethylene diisocyanate, isophoronediisocyanate, tolylene diisocyanate, 1,5-naphthylene diisocyanate, 4,4'-dicyclohexylmethanediisocyanate and the like, which may be used singly or in combination with two or more thereof. Among them, preference is given to the use of 4,4'-diphenylmethanediisocyanate. Also, polyisocyanates having three or more functional groups, such as triphenylmethanetriisocyanate may be used at a lower level, if necessary.

The type of the chain-lengthening agent to be used for producing the thermoplastic polyurethane (A) may not specifically be limited; therefore, use may be made of any of chain-lengthening agents having been conventionally used for producing general thermoplastic polyurethanes. Preferably, use may be made of a low-molecular compound with a molecular weight of 300 or below 300, having two or more (preferably two) active hydrogen atoms capable of reacting with the isocyanate group (—NCO) within the molecule. The low-molecular compound includes for example diols such as ethylene glycol, propylene glycol, 1,4-butanediol, 1,6-hexanediol, 1,4-bis(β-hydroxyethoxy) benzene, 1,4-cyclohexanediol, bis(β-hydroxyethyl) terephthalate, and xylylene glycol; diamines such as hydrazine, ethylenediamine, propylenediamine, xylylenediamine, isophoronediamine, piperazine or derivatives thereof, phenylenediamine, tolylenediamine, xylenediamine, adipodihydrazide, and isophthalodihydrazide; amino alcohols such as aminoethyl alcohol, and aminopropyl alcohol; and the like. One or two or more of them may be used. Among them, preferably, use may be made of aliphatic diols with 2 to 10 carbon atoms; and more preferably, use may be made of 1,4-butanediol. The amount of the chain-lengthening agent to be used may not specifically be limited, and an appropriate amount thereof may be selected, depending on the hardness to be given to polyurethane. Generally, a ratio of 0.1 to 10 moles to 1 mole of polymer diol may preferably be used; and more preferably, a ratio of 0.3 to 7 moles may be used.

For producing the thermoplastic polyurethane (A), peferably, the reaction of the polymer diol, the organic di-isocyanate and the chain-lengthening agent may be carried out at a ratio satisfying the following formula;

$$0.9 < b/(a+c) \leq 1.1$$

(wherein "a" represents the molar number of the polymer diol; "b" represents the molar number of the organic di-isocyanate; and "c" represents the molar number of the chain-lengthening agent.). By using a thermoplastic polyurethane produced by reacting together the polymer diol, the organic di-isocyanate and the chain-lengthening agent at a ratio satisfying the aforementioned formula, a resin composition with better mechanical performance, wear resistance and moldability can be produced.

The method for producing the thermoplastic polyurethane (A) is not specifically limited; and by using the aforementioned polymer diol, the organic di-isocyanate and the chain-lengthening agent and utilizing known urethanation reaction techniques, the polyurethane may be produced at an appropriate process such as prepolymer process and one-shot process. Among them, polymerization under molten conditions in the substantial absence of any solvent is preferable, and continous polymerization under molten conditions by means of a multiple screw extruder is preferable, in particular.

For producing the thermoplastic polyurethane (A) by using the polymer diol, the organic di-isocyanate and the chain-lengthening agent, use may be made of a tin catalyst for urethane preparation, with a catalytic activity for urethane preparation. Such tin catalyst for urethane preparation, if used, may rapidly increase the molecular weight of polyurethane, which is effective for producing polyurethane with better various characteristic properties. Such tin catalyst for urethane preparation includes for example dialkyltin diacylates such as dibutyltin diacetate and dibutyltin dilaurate; dialkyltin bis(mercaptocarboxylic acid ester) salts such as dibutyltin bis(ethoxybutyl 3-mercaptopropionate) salt. The amount of a tin catalyst for urethane preparation, if used, is preferably 0.5 to 15 ppm in the tin atom basis to the weight of the polyurethane (namely, the total weight of the reactive starting material compounds such as polymer diol, organic di-isocyanate and chain-lengthening agent for producing polyurethane).

So as to produce a resin composition with better mechanical performance, wear resistance and non-stickiness, the logarithmic viscosity of the thermoplastic polyurethane (A) is preferably 0.5 to 2.0 dl/g when the thermoplastic polyurethane is dissolved in an N,N-dimethylformamide solution containing n-butylamine in concentration of 0.05 mol/liter to make a final concentration of the polyurethane 0.5 g/dl. From such respect, the logarithmic viscosity is more preferably 0.8 to 1.9 dl/g.

The molecular main chain of polymer (B) having a hydroxyl group at the end, which is to be used in accordance with the present invention, principally comprises a conjugated diene compound unit (I) which may or may not be hydrogenated and an aromatic vinyl compound unit (II).

The polymer(B)-composing conjugated diene compound unit (I) which may or may not be hydrogenated, is a unit derived from a conjugated diene compound or a unit in the hydrogenated form thereof. The conjugated diene compound includes for example isoprene, 1,3-butadiene, 2,3-dimethyl- 1,3-butadiene, 1,3-pentadiene, and 1,3-hexadiene; among them, preference is given to isoprene. One type or two or more types of the unit (I) may be contained in the polymer (B). Preferably, the carbon-carbon double bond in the unit (I), present in the main chain of the polymer (B), should be hydrogenated at least partially from the respect of the production of a resin composition with better resistance against thermal deterioration and weatherability. In such terms, more preferably, 50% or more of the carbon-carbon double bonds in the unit (I) should be hydrogenated (namely, at an unsaturated degree of 50% or less); and particularly preferably, 80% or more of the bonds may be hydrogenated (namely, at an unsaturated degree of 20% or less).

The aromatic vinyl compound unit (II) composing the polymer (B) includes for example a unit derived from aromatic vinyl compounds, such as styrene, α-methylstyrene, o-methylstyrene, m-methylstyrene, p-methylstyrene, 2,4-dimethylstyrene, vinylnaphthalene, and vinylanthracene; among them, a unit derived from styrene is preferable. One type or two or more types of the unit (II) may be contained in the polymer (B).

From the respect of the production of a resin composition with better mechanical performance and wear resistance, the molar ratio of the unit (I)/unit (II) is within a range of 10/90 to 90/10 because the compatibility between the polymer (B) and the polyacetal resin (C) can then be improved. In such terms, the molar ratio of the unit (I) /the unit (II) is preferably within a range of 20/80 to 70/30.

The sequence of the unit (I) and the unit (II) in the main chain of the polymer (B) may satisfactorily be in any form of a random, block or tapered block form. However, preferably, the individual units may be in a sequence of a block form, from the respect of better compatibility of the resulting resin composition and better mechanical performance and moldability thereof. In other words, the polymer (B) preferably has a main chain structure of a block copolymer containing at least one polymer block principally comprising the unit (I) and at least one polymer block principally comprising the unit (II).

The polymer (B) should contain a hydroxyl group at the end of the main chain. The content of the hydroxyl group in the polymer (B) is preferably 0.5 to 2 hydroxyl groups, more preferably 0.8 to 1.5 hydroxyl groups as the average per one molecule. Those without any hydroxyl group at the ends thereof have poor affinity for the thermoplastic polyurethane (A) and for the polyacetal resin (C), and therefore, they cannot be finely dispersed in these resin compositions so that the tensile strength, impact resistance and wear resistance thereof are insufficient.

The number average molecular weight of the polymer (B) is preferably within a range of 1,000 to 300,000, more preferably within a range of 5,000 to 150,000, from the respect of the production of a resin composition with good balance in mechanical performance, moldability and the like. If the polymer (B) is a block copolymer comprising at least one polymer block principally comprising the unit (I) and at least one polymer block principally comprising the unit (II), the number average molecular weight of the polymer block principally comprising the unit (I) is preferably within a range of 100 to 270,000, and more preferably within a range of 10,000 to 200,000. In such case, additionally, the number average molecular weight of the polymer block comprising the unit (II) is preferably within a range of 100 to 270,000, and more preferably within a range of 3,000 to 150,000.

The method for producing the polymer (B) is not with specific limitation, and the polymer (B) may be produced by addition copolymerizing monomers principally comprising a conjugated diene compound and an aromatic vinyl compound by anion living polymerization using an organic alkali metal catalyst such as butyllithium, to generate a living polymer principally comprising a conjugated diene compound unit (I) and an aromatic vinyl compound unit (II), treating the active terminal of the polymer with an alkylene oxide such as ethylene oxide and propylene oxide, to introduce a hydroxyl group into the end of the main chain, and subsequently hydrogenating the conjugated diene compound unit, if desired, by using a known method.

As has been described above, preferably, the conjugated diene compound unit may partially or completely be hydrogenated. For hydrogenation of conjugated diene compound units, use may be made of homogeneous catalysts or heterogeneous catalysts as the catalysts. The homogenous catalysts include for example Ziegler catalysts as the combination of an organic transition metal catalyst (nickel acetylacetonate, cobalt acetylacetonate, nickel naphthenate, cobalt naphthenate and the like) with an alkyl compound of a metal such as aluminium, an alkali metal and an alkali earth metal. These catalysts may preferably be used at a ratio of 0.01 to 0.1 mole % to the carbon-carbon double bond contained in the conjugated diene compound unit. The hydrogenation is generally carried out at a temperature of from ambient temperature to 160° C. under a hydrogen pressure of from ambient pressure to 50 kg/cm$^2$, and the reaction is completed in about one to 50 hours.

In the resin composition of the present invention, further, at least part of the thermoplastic polyurethane (A) and at least part of the polymer (B) may or may not be present in the form of a block copolymer formed from the chemical reaction of the thermoplastic polyurethane (A) with the polymer (B) at the end hydroxyl position thereof. The block copolymer is block copolymer (D) of a polymer block comprising the thermoplastic polyurethane (A) and a polymer block comprising the polymer (B).

The polyacetal resin (C) to be used in the present invention is a polymer compound principally comprising a structural unit of oxymethylene group, in any form of polyoxymethylene homopolymer, or a copolymer, terpolymer or block copolymer containing smaller amounts of other structural units other than the oxymethylene group. Additionally, the molecular chain of the resin may be linear or may have a branched structure or a cross-linked structure.

To the total weight of the thermoplastic polyurethane (A), the polymer (B) having a hydroxyl group at the end and the polyacetal resin (C), the resin composition of the present invention contains the thermoplastic polyurethane (A) at a ratio of 2.5 to 90% by weight; the polymer (B) having a hydroxyl group at the end, at a ratio of 2.5 to 90% by weight; and the polyacetal resin (C), at a ratio of 5 to 95% by weight. In accordance with the present invention, the weight of the block comprising the thermoplastic polyurethane (A) incorporated into the block copolymer (D) and the weight of the block comprising the polymer (B) also incorporated into the copolymer (D) are summed into the weight of the thermoplastic polyurethane (A) and the weight of the polymer (B), respectively.

If the content of the thermoplastic polyurethane (A) is less than 2.5% by weight, the impact resistance at ambient temperature and tensile elongation of the resulting resin composition are insufficient, disadvantageously. If the content of the thermoplastic polyurethane (A) is above 90% by weight, the elasticity of the resulting resin composition is markedly decreased, inconveniently. If the content of the polymer (B) with a hydroxyl group at the end is less than 2.5% by weight, the effect of improving the impact resistance of the resulting resin composition, particularly the effect of improving the impact resistance at lower temperatures, is insufficient, disadvantageously. If the content of the polymer (B) having a hydroxyl group at the end is above 90% by weight, the elasticity of the resulting resin composition is severely decreased, disadvantageously. If the content of the polyacetal resin (C) is less than 5% by weight, the resulting resin composition has an insufficient tensile strength and the like, disadvantageously. If the content of the polyacetal resin (C) is above 95% by weight, furthermore, the impact resistance of the resulting resin composition is insufficient, inconveniently.

From the respect of the production of a resin composition with particularly great overall performance in terms of mechanical performance such as tensile strength and tensile elongation, and impact resistance at ambient temperature and lower temperatures, the contents of the thermoplastic polyurethane (A), the polymer (B) having a hydroxyl group at the end and the polyacetal resin (C) are preferably 2.5 to 47.5% by weight, 2.5 to 47.5% by weight and 50 to 95% by weight, respectively, to the total weight of (A), (B) and (C). From a similar respect, preferably, the weight ratio of (A)/(B) is 2/8 to 8/2.

The resin composition of the present invention contains the thermoplastic polyurethane (A), the polymer (B) having a hydroxyl group at the end, and the polyacetal resin (C) as the essential components thereof, but at an amount within a range without any adverse effect on the advantages of the present invention, if desired, the resin composition further may satisfactorily contain a variety of additives such as an antioxidant, an ultraviolet absorbent, an age resistor, an antistatic agent, a hydrolysis preventing agent, and a plasticizer; fillers such as talc, mica, and calcium carbonate; and polymers including polyolefins such as polypropylene and polyethylene, polystyrenes such as polystyrene and HIPS, PPE, and various TPEs.

The resin composition of the present invention can be produced by mixing together the thermoplastic polyurethane (A), the polymer (B) having a hydroxyl group at the end, the polyacetal resin (C) and other components if desired, provided that a part of the (A) and a part of the (B) may satisfactorily be used in the form of the block copolymer (D) for such mixing. As the mixing method, a variety of methods following the methods to be used for producing known resin compositions may be selected; and the mixing sequence of the individual components is not particularly limited. From the respect of highly reproducible production of a resin composition with better mechanical performance such as tensile strength and tensile elongation, and impact resistance at ambient temperature and lower temperatures, however, preference is given to a process of kneading together the individual components under molten conditions may be preferable; still more preferable is a process comprising melting and kneading together the thermoplastic polyurethane (A) and the polymer (B) having a hydroxyl group at the end and subsequently melting and kneading the polyacetal resin (C) into the resulting mixture, or a process comprising melting and kneading the thermoplastic polyurethane (A), the polymer (B) and the polyacetal resin (C), some parts of (A) and (B) being present in the form of the block copolymer (D). For mixing together the individual components, a mixer of a vertical type or a horizontal type, for general use, may be used. The temperature for their melt kneading is not specifically limited, but taking into account the molten temperatures and decomposition temperatures of the individual components, an appropriate temperature may be selected, preferably within a range of 100° to 270° C. in general.

For producing the thermoplastic polyurethane (A) in the substantial absence of any solvent by means of a multiple screw extruder by continous polymerization under molten conditions, the polymer (B) having a hydroxyl group at the end and the polyacetal resin (C) may be fed together into the extruder, to produce the resin composition of the present invention. Even by the process, as has been described above, it is preferable that the melt kneading of the thermoplastic polyurethane (A) or a starting material compound (monomer or prepolymer) thereof with the polymer (B) having a hydroxyl group at the end is preliminarily carried out, followed by kneading the polyacetal resin (C), so the positions for feeding the polymer (B) and the resin (C) should preferably be determined preliminarily.

In the resin composition of the present invention, the thermoplastic polyurethane (A) never incorporated within the molecule of the block copolymer (D) (referred to as "true thermoplastic polyurethane (A')" hereinbelow) has an action to increase the impact resistance at ambient temperature and the tensile strength and tensile elongation; but if the amount is too much, the elasticity tends to decrease. The polymer (B) never incorporated within the molecule of the block copolymer (D) (referred to as "true polymer (B')" hereinbelow) has an action to improve the impact resistance, particularly the impact resistance at lower temperatures; but if the amount is too much, the elasticity tends to decrease. As has been described above, the polyacetal resin (C) has an action to improve the tensile strength and tensile elongation and the like; but if the amount is too much, the impact resistance decreases. Furthermore, the block copolymer (D) has an action to improve the impact resistance; if the amount is too much, the melt-flow characteristics tend to decrease, leading to the lowering of the moldability. The block copolymer (D) is formed when the true thermoplastic polyurethane (A') and the true polymer (B') are in contact to each other in the presence or absence of the polyacetal resin (C) under heating conditions, so the block copolymer (D) separately produced preliminarily should not necessarily be used for the mixing procedure for producing the resin composition of the present invention. When a part of the thermoplastic polyurethane (A) and a part of the polymer (B) are used in the form of the block copolymer (D), the true thermoplastic polyurethane (A'), the true polymer (B'), the polyacetal resin (C) and the block copolymer (D) are used preferably at ratios of 2 to 90% by weight, 2 to 90% by weight, 5 to 95% by weight and 1 to 60% by weight, respectively, to the total weight of them for use, taking into consideration of the overall characteristic properties described above. More preferably, the true thermoplastic polyurethane (A'), the true polymer (B'), the polyacetal resin (C) and the block copolymer (D) are used at ratios of 2 to 46.5% by weight, 2 to 46.5% by weight, 50 to 95% by weight and 1 to 46% by weight, respectively. From the respect of the characteristic properties described above, it is preferable that the individual amounts of the true thermoplastic polyurethane (A'), the true polymer (B') and the block copolymer (D) to be used further satisfy the conditions such that (A')/(B') weight ratio might be 2/8 to 8/2 and [(A')+(B') in total]/(D) weight ratio might be 4/6 to 9/1. For producing the resin composition of the present invention, by using the block copolymer (D) separately prepared preliminarily together with the true thermoplastic polyurethane (A'), the true polymer (B') and the polyacetal resin (C), the block structure of the block copolymer (D) may satisfactorily be prepared as a different one from the true thermoplastic polyurethane (A') and/or the true polymer (B').

Furthermore, the block copolymer (D) may be produced by a method comprising reacting the true thermoplastic polyurethane (A') with the true polymer (B') under melt kneading conditions, by a method comprising reaching them together in solution under heating, or a method comprising urethanating (or polymerizing) together a monomer or prepolymer giving the true thermoplastic polyurethane (A') in the presence of the true polymer (B'). By these reactions, generally, the block copolymer (D) is generated as a composition thereof with the true thermoplastic polyurethane (A') and the true polymer (B'). Therefore, the composition may be used as it is without any purification for producing the resin composition of the present invention. From the composition produced through the reaction described above, the true thermoplastic polyurethane (A') is extracted and removed out into a good solvent for the polyurethane, such as dimethylformamide, while the true polymer (B') is extracted and removed out into a good solvent for the polymer, such as cyclohexane, whereby the purity of the block copolymer (D) can be increased. Then, the block copolymer (D) thus purified may be used for producing the resin composition of the present invention.

The resin composition of the present invention is readily thermally melt molded and processed under heating, and may be molded and processed by an appropriate molding process such injection molding, extrusion, blow molding, calendaring, and casting. The molded articles comprising the resin composition thus produced of the present invention encompass articles of an appropriate form such as film form, sheet form, tube form, three-dimensional form and the like. The molded articles may be supplied for a variety of applications such as automobile parts, appliance parts, computer parts, mechanical parts, packing, gaskets, hose and the like.

As has been described above, the resin composition of the present invention is excellent in terms of tensile strength and tensile elongation, impact resistance at ambient temperature and lower temperatures and moldability. The molded articles of the present invention exert these excellent properties, effectively.

The present invention will now be described in detail in examples, but the invention is not limited to these examples.

In the examples, the tensile strength and tensile elongation, the impact resistance, the surface state of molded articles and the compatibility were measured or assessed by the following methods.

Tensile break strength and tensile break elongation

By using a dumbbell piece produced from injection molding of the resin composition, the tensile strength and tensile elongation thereof were measured according to JIS K7311.

Impact resistance

By using an Izod test piece (with a mold notch) produced by injection molding of the resin composition, the Izod impact test thereof was conducted at two points of 25° C. and −20° C.

Surface state of the molded articles

By visually observing the surface state of a test piece of a dumbbell piece produced by injection molding of the resin composition, the surface state was evaluated as good or poor, from the respect as to whether peeling occurs on the surface.

Compatibility

By breaking a test piece of the dumbbell piece under cooling conditions to form a breaking face and subsequently etching the face with dimethylformamide to observe the surface around the central part of the breaking face under a scanning electron microscope (SEM), the state of the dispersed particles was assessed to measure the average diameter of the dispersed particles.

Reference Example 1 (Synthesis of a polymer diol)

In to a reaction vessel were charged 3-methyl-1,5-pentanediol (1,420 g) and adipic acid (1,460 g). While purging nitrogen gas into the system under ambient pressure and removing the generated water at about 220° C. out of the system, the esterification reaction was carried out. When the acid number of the generated polyester diol reached 0.3 or less, the vacuum degree was gradually increased by means of a vacuum pump, to complete the reaction. The number average molecular weight of the resulting polyester diol (referred to as "PMPA" hereinbelow) was 3,500.

Reference Example 2 (Synthesis of a thermoplastic polyurethane)

Continuously feeding the PMPA produced in the Reference Example 1, 1,4-butanediol (BD) and 4,4'-diphenylmethanediisocyanate (MDI) at a PMPA/BD/MDI molar ratio of 1/3.13/4.13 and their total weight of 300 g per minute into a twin-screw extruder (30 mm Φ, L/D=36, cylinder temperature of 75° to 260° C.) rotating in the same direction by means of a constant-delivery pump, continuous polymerization under molten conditions was conducted. Continuously extruding the molten polyurethane generated in a strand form into water, the polyurethane was cut into pellets by means of a pelletizer, which were dried through dehumidification at 80° C. for 20 hours, to prepare a thermoplastic polyurethane (referred to as "TPU-1" hereinbelow).

Reference Example 3 (Synthesis of a polymer having a hydroxyl group at the end)

After anion polymerization of styrene monomer in cyclohexane by using n-butyllithium as an initiator, isoprene monomer was added to the resulting product solution to prepare a living block polymer. Adding furthermore ethylene oxide of a molar number 10-fold that of the active terminal of the resulting polymer to the polymer followed by addition of methanol, the reaction was terminated. In such manner, a polystyrene-polyisoprene diblock copolymer having a hydroxyl group at the molecular end was recovered.

Solubilizing the polystyrene-polyisoprene diblock copolymer having a hydroxyl group at the end in cyclohexane, and subsequently adding a Raney-nickel catalyst for hydrogenation at 150° C. and a hydrogen pressure of 50 kg/cm$^2$, a hydrogenated product of the polystyrene-polyisoprene diblock copolymer having a hydroxyl group at the end of the molecular main chain (referred to as "SEP-OH" hereinbelow) was recovered.

In the SEP-OH, the number average molecular weight of the polymer block comprising the styrene unit is 10,000; and the number average molecular weight of the polymer block principally comprising the hydrogenated isoprene unit is 21,000, wherein the molar ratio of the styrene unit/the isoprene unit (as the total of the hydrogenated unit and the unit without hydrogenation) is 25/75; as to the content of the hydroxyl group, 0.89 hydroxyl group is contained as the average per one molecule and the hydrogenation ratio of the carbon-carbon double bond in the isoprene unit is 97%.

Reference Example 4 (Synthesis of a polymer without any hydroxyl group at the end)

A hydrogenated product of a polystyrene-polyisoprene diblock copolymer without any hydroxyl group at the end (referred to as "SEP" below) was produced by the same reaction procedures and the same treatment procedures as in the Reference Example 3, except for the termination of the reaction with methanol but without any addition of ethylene oxide, after the production of the living block polymer.

Reference Example 5 (Synthesis of a block copolymer from the thermoplastic polyurethane and the polymer having a hydroxyl group at the end)

After pellet blending the TPU-1 produced in Reference Example 2 with the SEP-OH produced in Reference Example 3 at a TPU-1/SEP-OH weight ratio of 50/50, the resulting pellet mixture was melt kneaded together in a twin-screw extruder (at a cylinder temperature of 220° C.). The mixture obtained by melt kneading was ground by means of a grinder to prepare the mixture into fine powder. To the powdery matter was added dimethylformamide for agitation at ambient temperature for 10 hours, to extract the unreacted TPU-1. Then, solid matters were separated by filtration and dried. Subsequently adding cyclohexane to the dried powdery solid matters for agitation at a temperature of 100° C. for 10 hours, the unreacted SEP-OH was extracted, to separate by filtration and dry the resulting solid matters. By gel permeation chromatography and the like, it was determined that the resulting powdery matter was a block copolymer (referred to as "SEP-TPU" hereinafter), having a polymer block corresponding to TPU-1 and a polymer block corresponding to SEP-OH (which has lost the hydroxyl group).

The ratio of SEP-TPU produced was 43% by weight on the basis of the melt kneaded product described above.

EXAMPLE 1

By continous polymerization under molten conditions by using a twin-screw extruder in the same manner as in the Reference Example 2, a thermoplastic polyurethane (referred to as "TPU-2" hereinbelow) was produced; and furthermore, the SEP-OH (the polymer with a hydroxyl group at the end, which was preliminarily produced in the Reference Example 3) and a polyacetal resin [Derlin 100P, manufactured by Dupont Japan (referred to as "POM" hereinafter)] were individually fed at predetermined positions of the twin-screw extruder so that the SEP-OH might firstly be kneaded into the TPU-2 flowing in the twin-screw extruder and subsequently the POM might be kneaded into the resulting mixture at about 200° C. Their feeding levels were preset so that the weight ratio of the TPU-2/SEP-OH/POM might be 15/15/70. Continuously extruding the generated molten matter of the resin composition in a strand form into water from the extruder, which was then cut into pellets by means of a pelletizer to be dehumidified and dried at 80° C. for 20 hours, whereby a resin composition (referred to as "Resin Composition-1" hereinbelow) was prepared.

Injection molding the Resin Composition-1 in generation, the resulting molded article was subjected to a variety of assessment. The results of the assessment are shown in Table 1.

EXAMPLE 2

After pellet blending the TPU-1 generated in the Reference Example 2, the SEP-OH produced in the Reference Example 3 and POM at a TPU-1/SEP-OH/POM weight ratio of 15/15/75, the pellet mixture was fed into a twin-screw extruder for melt kneading at about 200° C. Continuously extruding the generated molten matter of the resin composition in a strand form into water from the extruder, which was then cut into pellets by means of a pelletizer to be dehumidified and dried 80° C. for 20 hours, a resin composition (referred to as "Resin Composition-2" hereinbelow) was prepared.

Injection molding the Resin Composition-2 in generation, the resulting molded article was subjected to a variety of assessment. The results of the assessment are shown in Table 1.

EXAMPLE 3

After pellet blending the TPU-1 generated in the Reference Example 2, and the SEP-OH produced in the Reference Example 3 at a TPU-1/SEP-OH weight ratio of 15/15, the pellet mixture was fed into a twin-screw extruder (at a cylinder temperature of 70° to 260° C.) for melt kneading, to prepare a melt kneaded mixture of the TPU-1 and the SEP-OH. The generated melt kneaded matter was continuously extruded in a strand form into water from the extruder, which was then cut into pellets by means of a pelletizer to be dehumidified and dried at 80° C. for 20 hours.

The melt kneaded matter in pellets and POM were fed at a weight ratio of the melt kneaded matter/POM of 30/70 into a twin-screw extruder, and were then melted and kneaded together at a temperature of about 200° C. Continuously extruding the generated melt kneaded matter of the resin composition in a strand form into water from the extruder, which was then cut into pellets by means of a pelletizer to be dehumidified and dried at 80° C. for 20 hours, a resin composition (referred to as "Resin Composition-3" hereinbelow) was prepared.

Injection molding the Resin Composition-3 in generation, the resulting molded article was subjected to a variety of assessment. The results of the assessment are shown in Table 1 below.

EXAMPLE 4

After melt kneading together TPU-1 and SEP-OH by means of a twin-screw extruder followed by extrusion and cutting in the same manner as in the Reference Example 5, to prepare a pellet composition (TPU-1/SEP-OH/SEP-TPU weight ratio of 4/4/6), 14 parts by weight of the resulting pellet composition were pellet blended with 70 parts by weight of POM, 8 parts by weight of TPU-1 and 8 parts by weight of SEP-OH. The resulting pellet mixture (TPU-1/SEP-OH/POM/SEP-TPU weight ratio of 12/12/70/6) was supplied into a twin-screw extruder, for melt kneading at about 200° C. The resulting molten resin composition was continuously extruded in a strand form into water from the extruder, which was then cut into pellets. The pellets were dehumidified and dried at 80° C. for 20 hours, to prepare a resin composition (referred to as "Resin Composition-4" hereinafter).

The resulting Resin Composition-4 was injection molded into a molded article, which was then subjected to a variety of assessment. The results of the assessment are shown in Table 1 below.

EXAMPLE 5

After pellet blending 6 parts by weight of the SEP-TPU produced in Reference Example 5 with 70 parts by weight of POM, 12 parts by weight of TPU-1 and 12 parts by weight of SEP-OH, the resulting pellet mixture was supplied into a twin-screw extruder and then melt kneaded together at about 200° C. The resulting molten resin composition was continuously extruded in a strand form into water from the extruder, which was then cut into pellets by means of a pelletizer. The pellets were dehumidified and dried at 80° C. for 20 hours, to prepare a resin composition (referred to as "Resin Composition-5" hereinafter).

The resulting Resin Composition-5 was injection molded into a molded article, which was subjected to a variety of assessment. The results of the assessment are shown in Table 1 below.

Comparative Example 1

The same procedures as in Example 3 were carried out, except for the use of SEP instead of SEP-OH, to prepare a corresponding resin composition (referred to as "Resin Composition-6" hereinbelow). The resulting Resin Composition-6 was injection molded to prepare a molded article, which was then subjected to a variety of assessment. The results of the assessment are shown in Table 1 below.

Comparative Example 2

The same procedures as in Example 3 were carried out, except that the weight ratio of the melt kneaded matter/POM was changed from 30/70 to 2/98, to prepare a corresponding resin composition (referred to as "Resin Composition-7" hereinbelow). The resulting Resin Composition-7 was injection molded to subsequently subject the resulting molded article to a variety of assessment. The results of the assessment are shown in Table 1 below.

Comparative Example 3

POM was injection molded as it was, and the resulting molded article was subjected to a variety of assessment. The results of the assessment are shown in Table 1 below.

Comparative Example 4

The same procedures as in Example 2 were carried out, except for the use of only TPU-1 and POM at their weight ratio of 15/70 with no use of SEP-OH, to prepare a resin composition (referred to as "Resin Composition-8" hereinbelow). The resulting Resin composition-8 was injection molded to prepare a molded article, which was then subjected to a variety of assessment. The results of the assessment are shown in Table 1 below.

Comparative Example 5

The same procedures as in Example 2 were carried out, except for the use of only SEP-OH and POM at their weight ratio of 15/70 with no use of TPU-1, to prepare a resin composition (referred to as "Resin Composition-9" hereinbelow). The resulting Resin Composition-9 was injection molded to prepare a molded article, which was then subjected to a variety of assessment. The results of the assessment are shown in Table 1 below.

TABLE 1

| | Resin composition or resin | Tensile break strength (MPa) | Tensile break elongation (%) | Izod impact resistance (kJ/m$^2$) at 25° C. | Izod impact resistance (kJ/m$^2$) at −20° C. | Surface state of molded articles | Average diameter (∞m) of dispersed particles |
|---|---|---|---|---|---|---|---|
| Example 1 | Resin Composition-1 | 37 | 86 | 25 | 10 | good | 0.4 |
| Example 2 | Resin Composition-2 | 37 | 54 | 12 | 7.1 | good | 0.2 |
| Example 3 | Resin Composition-3 | 39 | 96 | 47 | 27 | good | 0.1 |
| Example 4 | Resin Composition-4 | 39 | 107 | 47 | 28 | good | 0.1 |
| Example 5 | Resin Composition-5 | 39 | 111 | 46 | 30 | good | 0.1 |
| Comparative example 1 | Resin Composition-6 | 29 | 47 | 7.1 | 6.9 | poor | 1.5 |
| Comparative example 2 | Resin Composition-7 | 59 | 45 | 3.9 | 3.4 | good | 0.6 |
| Comparative example 3 | POM | 53 | 100 or more | 4.0 | 3.5 | good | — |
| Comparative example 4 | Resin Composition-8 | 38 | 100 or more | 7.0 | 4.0 | good | 0.2 |
| Comparative example 5 | Resin Composition-9 | 39 | 30 | 7.2 | 6.5 | poor | 2.0 |

Table 1 above shows that the resin compositions produced in Examples 1 to 5 in accordance with the present invention are excellent in terms of all of tensile strength and tensile elongation, impact resistance at ambient temperature and lower temperatures and moldability. On the contrary, it is indicated that; in case that in stead of the polymer (B) having a hydroxyl group at the end, a polymer with the same structure as that of the polymer (B) except for no presence of any hydroxyl group on the end is used (Comparative Example 1), tensile strength, impact resistance, and moldability and the like are insufficient; in case that either of the thermoplastic polyurethane (A) and the polymer (B) having a hydroxyl group at the end is not much or never contained (Comparative Examples 2 and 3), the impact resistance at ambient temperature and lower temperatures is insufficient; and in case that the polymer (B) having a hydroxyl group at the end is never contained (Comparative Example 4), the impact resistance, particularly impact resistance at lower temperatures, is insufficient; in case that the thermoplastic polyurethane (A) is never contained (Comparative Example 5), the tensile elongation, impact resistance at ambient temperature and moldability are insufficient. It is also indicated that among the resin compositions in accordance with the present invention, a resin composition produced by melt kneading together the thermoplastic polyurethane (A) and the polymer (B) having a hydroxyl group at the end and subsequently melt kneading the polyacetal resin (C) into the resulting mixture (Examples 1 and 3), and a resin composition produced by using the thermoplastic polyurethane (A) and the polymer (B), some parts of which are present in the form of the block copolymer (D), and melt kneading them with the polyacetal resin (C) (Examples 4 and 5), are particularly great in terms of the tensile strength, impact resistance at ambient temperature and lower temperatures and the like.

What is claimed is:

1. A resin composition, comprising
a thermoplastic polyurethane (A);
a polymer (B) having a hydroxyl group at the end of the molecular main chain, the main chain principally comprising a conjugated diene compound unit (I) which is hydrogenated and an aromatic vinyl compound unit (II), wherein the molar ratio of the unit (I) / the unit (II) is within a range of 10/90 to 90/10; and
a polyacetal resin (C),
wherein (A) is present in an amount ranging from 2.5 to 47.5% by weight;
wherein (B) is present in an amount ranging from 2.5 to 47.5% by weight; and
wherein (C) is present in an amount ranging from 50 to 95% by weight on the basis of the total weight of the (A), (B) and (C);
wherein the content of the hydroxyl group in polymer (B) having a hydroxyl group at the end is 0.5 to 2 hydroxyl groups as the average per one molecule;
wherein the polymer (B) having a hydroxyl group at the end has a main chain structure of a block copolymer containing at least one polymer block principally comprising the unit (I) and at least one polymer block principally comprising the aromatic vinyl compound unit (II);
wherein the thermoplastic polyurethane (A) is a thermoplastic polyurethane produced by the reaction of a polymer diol of a number average molecular weight of 1,500 to 6,000, an organic di-isocyanate and a chain-lengthening agent at a ratio satisfying the following formula:

$0.9 < b/(a+c) < 1.1$. where a represents the molar number of the polymer diol, b represents the molar number of the organic di-isocyanate and c represents the molar number of the chain-lengthening agent; and wherein the weight ratio of (A)/(B) is 2/8 to 8/2.

2. A resin composition according to claim 1, produced by kneading together the thermoplastic polyurethane (A), the polymer (B) having a hydroxyl group at the end and the polyacetal resin (C) under molten conditions.

3. A resin composition according to claim 2, produced by melt kneading together the thermoplastic polyurethane (A) and the polymer (B) having a hydroxyl group at the end and subsequently melt kneading the polyacetal resin (C) into the mixture.

4. A resin composition according to claim 2, wherein a part of the thermoplastic polyurethane (A) and a part of the polymer (B) having a hydroxyl group at the end are used in the form of the block copolymer.

5. A molded article comprising the resin composition according to claim 1.

6. The resin composition of claim 1, wherein said compound unit (I) is hydrogenated; and wherein at least part of the thermoplastic polyurethane (A) and at least part of the polymer (B) are present in the form of a block copolymer formed from the chemical reaction of the thermoplastic polyurethane (A) with the polymer (B) at the end hydroxyl position thereof.

* * * * *